(12) United States Patent
Silverbrook et al.

(10) Patent No.: US 7,557,828 B2
(45) Date of Patent: Jul. 7, 2009

(54) COMPACT CAMERA MODULE AND PRINTER SYSTEM

(75) Inventors: Kia Silverbrook, Balmain (AU); Simon Robert Walmsley, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 826 days.

(21) Appl. No.: 10/954,168

(22) Filed: Oct. 1, 2004

(65) Prior Publication Data

US 2005/0110872 A1    May 26, 2005

Related U.S. Application Data

(63) Continuation of application No. 09/575,135, filed on May 23, 2000, now Pat. No. 6,812,972.

(30) Foreign Application Priority Data

May 25, 1999    (AU) .................................... PQ0560

(51) Int. Cl.
    *H04N 5/225* (2006.01)
(52) U.S. Cl. .................................... 348/207.2; 348/373
(58) Field of Classification Search ............. 348/207.1, 348/207.2, 207.11, 552, 373–376, 371, 370; 347/13, 42; 396/171, 173
    See application file for complete search history.

(56) References Cited

U.S. PATENT DOCUMENTS

| | | | |
|---|---|---|---|
| 3,518,417 A * | 6/1970 | Bertrams ...................... 362/11 |
| 3,971,065 A | 7/1976 | Bayer |
| 4,903,132 A | 2/1990 | Yamawaki et al. |
| 4,937,676 A | 6/1990 | Finelli et al. |
| 5,012,349 A * | 4/1991 | de Fay ........................ 358/296 |
| 5,016,037 A * | 5/1991 | Taniguchi et al. ........... 396/182 |
| 5,028,997 A | 7/1991 | Elberbaum |
| 5,300,976 A | 4/1994 | Lim et al. |
| 5,477,264 A * | 12/1995 | Sarbadhikari et al. ..... 348/231.6 |
| 5,493,409 A | 2/1996 | Maeda et al. |
| 5,539,194 A | 7/1996 | Miller et al. |
| 5,661,506 A | 8/1997 | Lazzouni et al. |
| 5,699,102 A | 12/1997 | Ng et al. |
| 5,715,493 A | 2/1998 | Stephenson |
| 5,734,414 A | 3/1998 | Nishimura et al. |
| 5,748,326 A | 5/1998 | Thompson-Bell et al. |

(Continued)

FOREIGN PATENT DOCUMENTS

EP    949804    10/1999

(Continued)

*Primary Examiner*—Lin Ye
*Assistant Examiner*—Nelson D Hernández Hernández

(57) ABSTRACT

A compact camera module is provided with a connection to a printer system. The camera module includes a body that has a camera portion rotatable between a first position aligned on a common axis with a base portion and a second position for capturing images. The camera module includes a CMOS image sensor that captures an RGB image when a take button is actuated. The RGB image is transformed to a suitable format, such as L*a*b*, for transfer directly to a printer module. The camera module incorporates a connection means connects the camera module directly to a corresponding connection means on the printer module. The connection means includes a physical connection and a logical connection. The logical connection is a serial bus that communicates power and data.

11 Claims, 14 Drawing Sheets

U.S. PATENT DOCUMENTS

| | | | |
|---|---|---|---|
| 5,894,326 A | 4/1999 | McIntyre et al. | |
| 6,014,457 A | 1/2000 | Kubo et al. | |
| 6,069,711 A * | 5/2000 | Iwata | 358/400 |
| 6,081,422 A | 6/2000 | Ganthier et al. | |
| 6,124,892 A | 9/2000 | Nakano | |
| 6,229,565 B1 * | 5/2001 | Bobry | 348/207.99 |
| 6,259,469 B1 * | 7/2001 | Ejima et al. | 348/14.01 |
| 6,268,882 B1 | 7/2001 | Elberbaum | |
| 6,356,308 B1 | 3/2002 | Hovanky | |
| 6,445,417 B1 | 9/2002 | Yoshida et al. | |
| 6,556,245 B1 | 4/2003 | Holmberg | |
| 6,573,939 B1 | 6/2003 | Yokoyama | |
| 6,628,333 B1 * | 9/2003 | Gowda et al. | 348/333.11 |
| 6,657,657 B1 * | 12/2003 | Sato | 348/207.2 |
| 6,812,972 B1 * | 11/2004 | Silverbrook et al. | 348/376 |
| 2002/0001032 A1 * | 1/2002 | Ohki | 348/207 |
| 2002/0015592 A1 | 2/2002 | Kawamura et al. | |
| 2004/0032501 A1 | 2/2004 | Silverbrook et al. | |

FOREIGN PATENT DOCUMENTS

| | | |
|---|---|---|
| EP | 949804 A2 | 10/1999 |
| JP | 10155053 A | 8/1998 |
| JP | 10-301718 A | 11/1998 |
| JP | 10-155053 | 1/1999 |
| JP | 11-275501 | 1/1999 |
| JP | 11122565 A | 4/1999 |
| JP | 11-122565 | 9/1999 |
| JP | 11-243516 | 9/1999 |
| JP | 11243516 A | 9/1999 |
| JP | 11249233 A | 9/1999 |
| JP | 11-249233 | 10/1999 |
| JP | 11-275418 | 10/1999 |
| JP | 11275418 A | 10/1999 |
| JP | 11275501 A | 10/1999 |
| JP | 11-317897 | 11/1999 |
| JP | 11317897 A | 11/1999 |
| WO | WO 99/04368 | 4/1999 |
| WO | WO 00/28379 | 5/2000 |

\* cited by examiner

COMPACT CAMERA MODULE AND PRINTER SYSTEM

CROSS REFERENCE TO RELATED APPLICATION

The present application is a continuation of U.S. application Ser. No. 09/575,135 filed on May 23, 2000, now issued as U.S. Pat. No. 6,812,972, the entire contents of which are herein incorporated by reference.

FIELD OF THE INVENTION

The invention relates to a printer system able to print full-color, business card size documents from a device about the size of a pen. The system includes various hot-connectable modules that provide a range of functions. In particular the invention relates to a camera module for the compact printer system.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| USSN | Title |
| --- | --- |
| 6,924,907 | Compact Color Printer Module |
| 6,712,452 | Modular Compact Printer System |
| 6,416,160 | Nozzle Capping Mechanism |
| 6,238,043 | Ink Cartridge for Compact Printer System |
| 6,958,826 | Controller for Printer Module |
| 6,553,459 | Memory Module for Compact Printer System |
| 6,967,741 | Effects Module for Compact Printer System |
| 6,956,669 | Effects Processor for Effects Module |
| 6,903,766 | Timer Module for Compact Printer System |
| 6,804,026 | Color Conversion Method for Compact Printer System |
| 7,259,889 | Method and Apparatus of Dithering |
| 6,975,429 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support For instance, it is impractical to carry a color printer for the purpose of instantly printing photographs taken with known compact digital cameras.

A compact printhead has been described in co-pending United States Patent Applications filed simultaneously to the present application and hereby incorporated by cross reference:

| USSSN | Title |
| --- | --- |
| 6,428,133 | Ink jet printhead having a moving nozzle with an externally arranged actuator |
| 6,526,658 | Method of manufacture of an ink jet printhead having a moving nozzle with an externally arranged actuator |
| 6,390,591 | Nozzle guard for an ink jet printhead |
| 7,018,016 | Fluidic seal for an ink jet nozzle assembly |
| 6,328,417 | Ink jet printhead nozzle array |

Although digital cameras are known, they require connection to a personal computer before a hardcopy image can be obtained. Generally, it is necessary to upload images from the camera to the personal computer and then print the images on a desktop printer using a proprietary software package that makes the necessary translation between the image format taken by the camera and the format required by the printer. A camera that is able to link directly to a compact printer would be more desirable.

SUMMARY OF THE INVENTION

In one form, the invention resides in a compact camera module and printer system comprising:
an inkjet printer module having a full-width stationary printhead for printing a stored image on printable media in a single pass and having at least one first connection means;
a body having a camera portion and a base portion connected to said camera portion by a pivot assembly;
an image sensor within said body that captures an image of a scene;
an image processor within said body that processes said image into a form suitable for transferring directly to said inkjet printer module;
a connection means at an end of said body connecting said camera module to said printer module, said connection means incorporating connection to a bus providing power and data between said camera module and said printer module.

In a related aspect, there is provided camera module for a compact printer system comprising:
a body;
an image sensor within said body that captures an image of a scene;
an image processor within said body that processes said image into a form suitable for transferring directly to a printer module;
a connection means at an end of said body for connecting said camera module to said printer module, said connection means incorporating connection to a bus providing power and data between said camera module and said printer module.

Further features of the invention will be evident from the following description.

BRIEF DESCRIPTION OF THE DRAWINGS

In order to assist with describing preferred embodiments of the invention, reference will be made to the following figures in which.

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
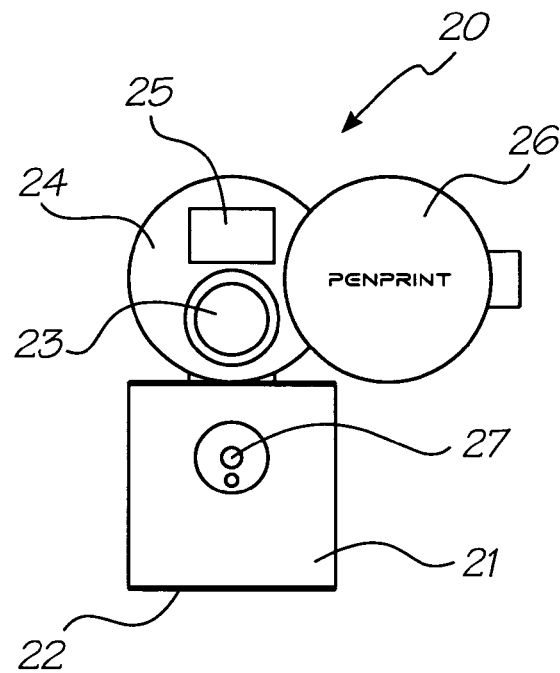
FIG. 2 is a camera module.
Figure 3:
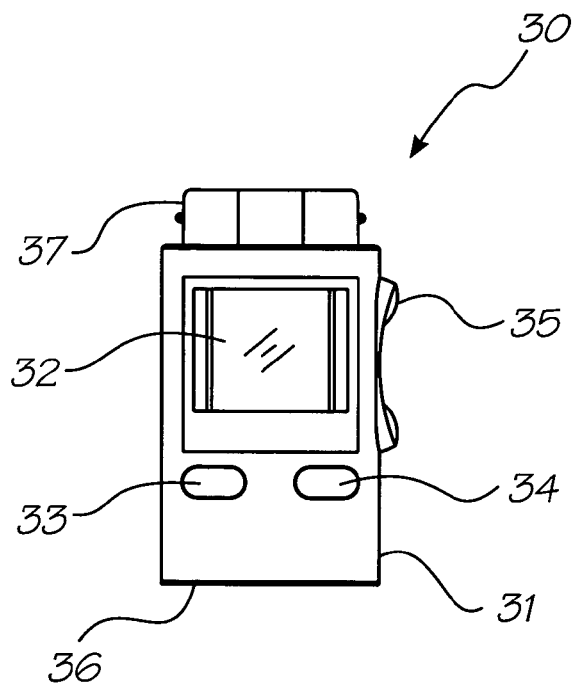
FIG. 3 is a memory module.
Figure 6:
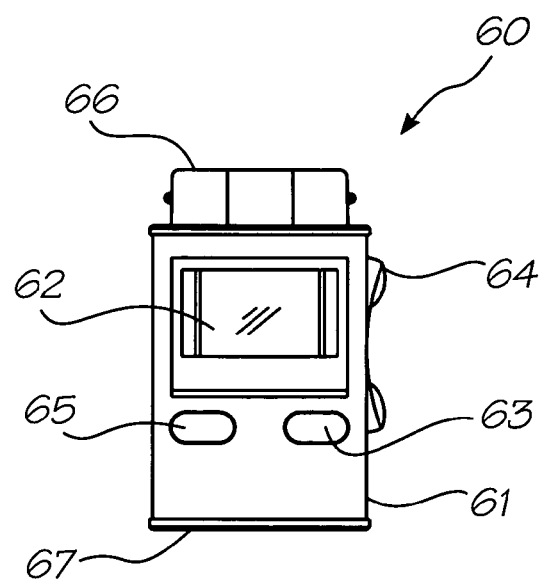
FIG. 6 is a timer module.
Figure 7:
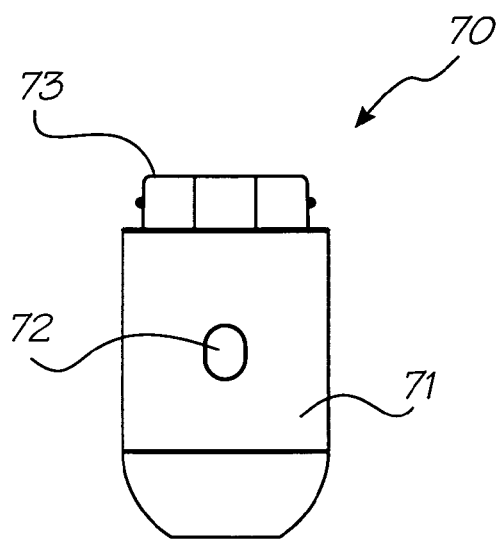
FIG. 7 is a laser module.

Compact printer modules can be grouped into three types:

image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;

housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
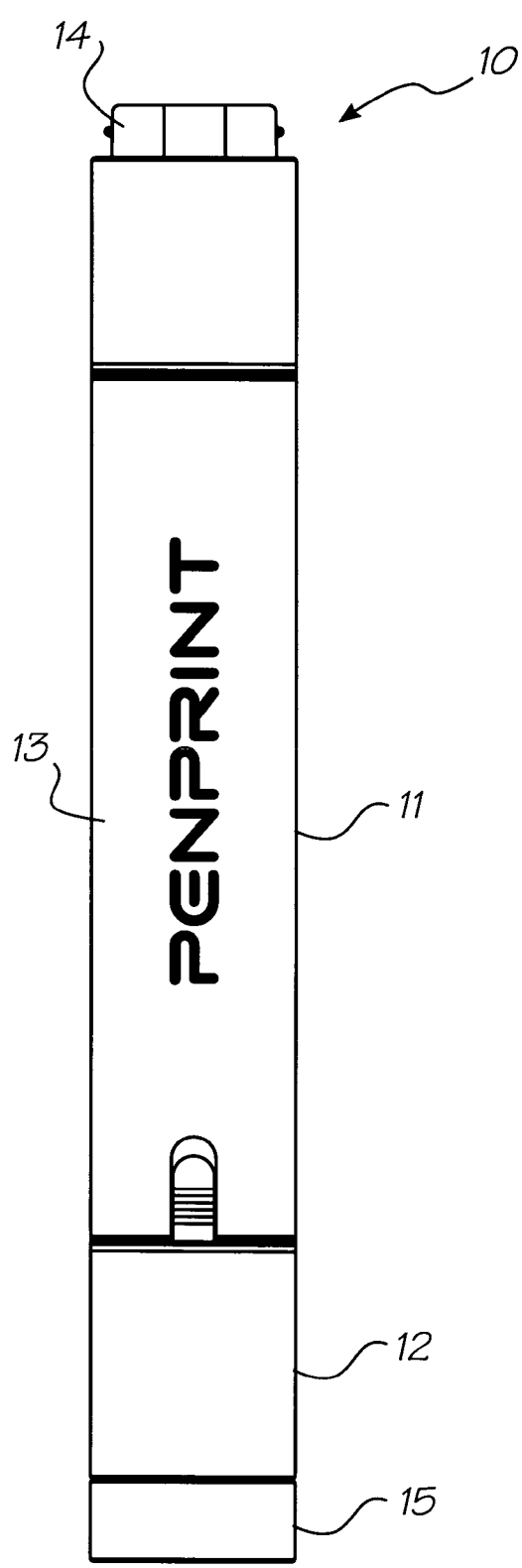
FIG. 1 is a printer module.

FIG. 1 shows a printer module that incorporates a compact printhead described in co-pending U.S. patent applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 µm in diameter, and spaced 15.875 µm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera portion 24. A conventional view finder 25 is provided as well as a lens cap 26. An image is captured when the Take button 27 is pushed. Captured images are processed and transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

Figure 4:
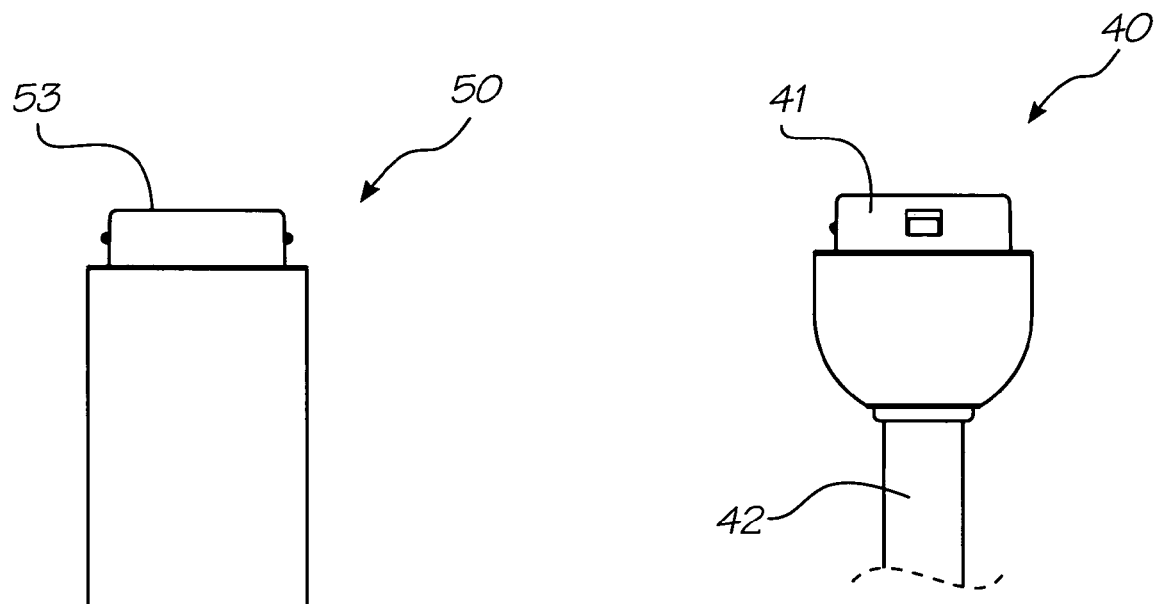
FIG. 4 is a communication module.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

Figure 5:
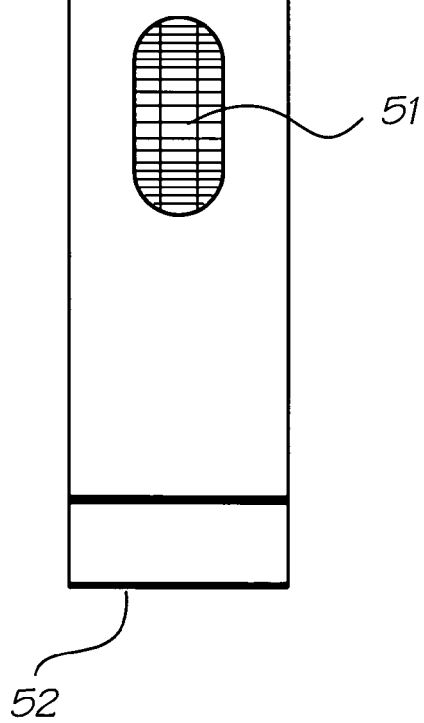
FIG. 5 is a flash module.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
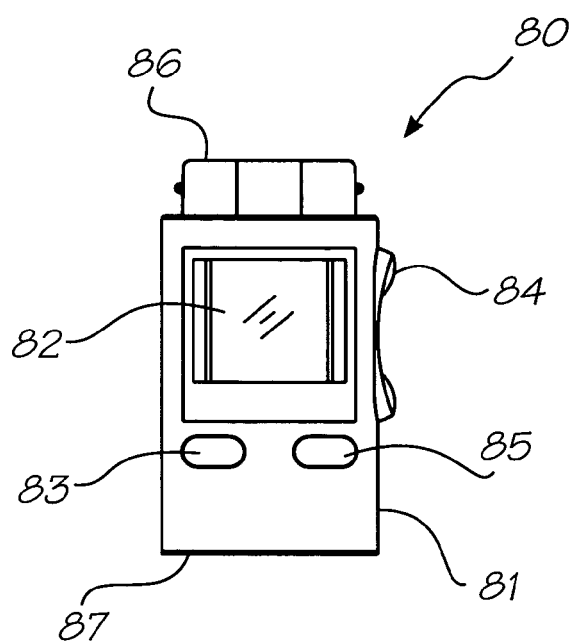
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
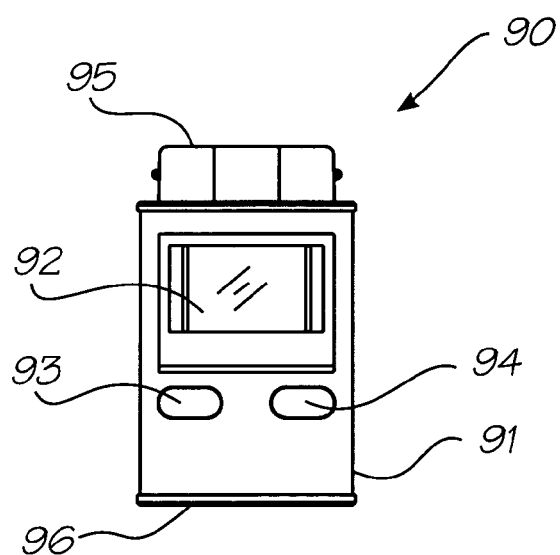
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
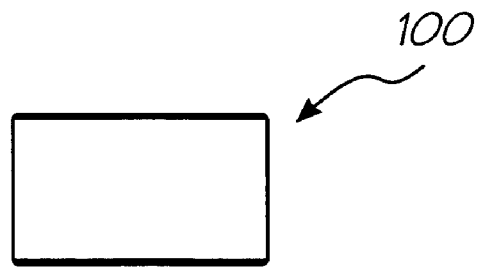
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
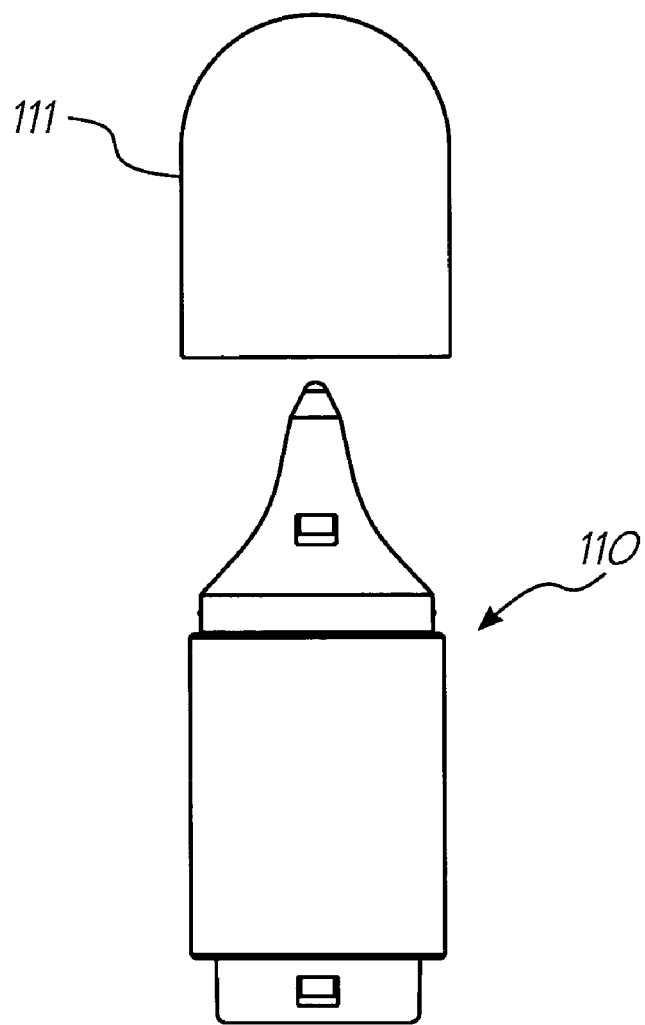
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
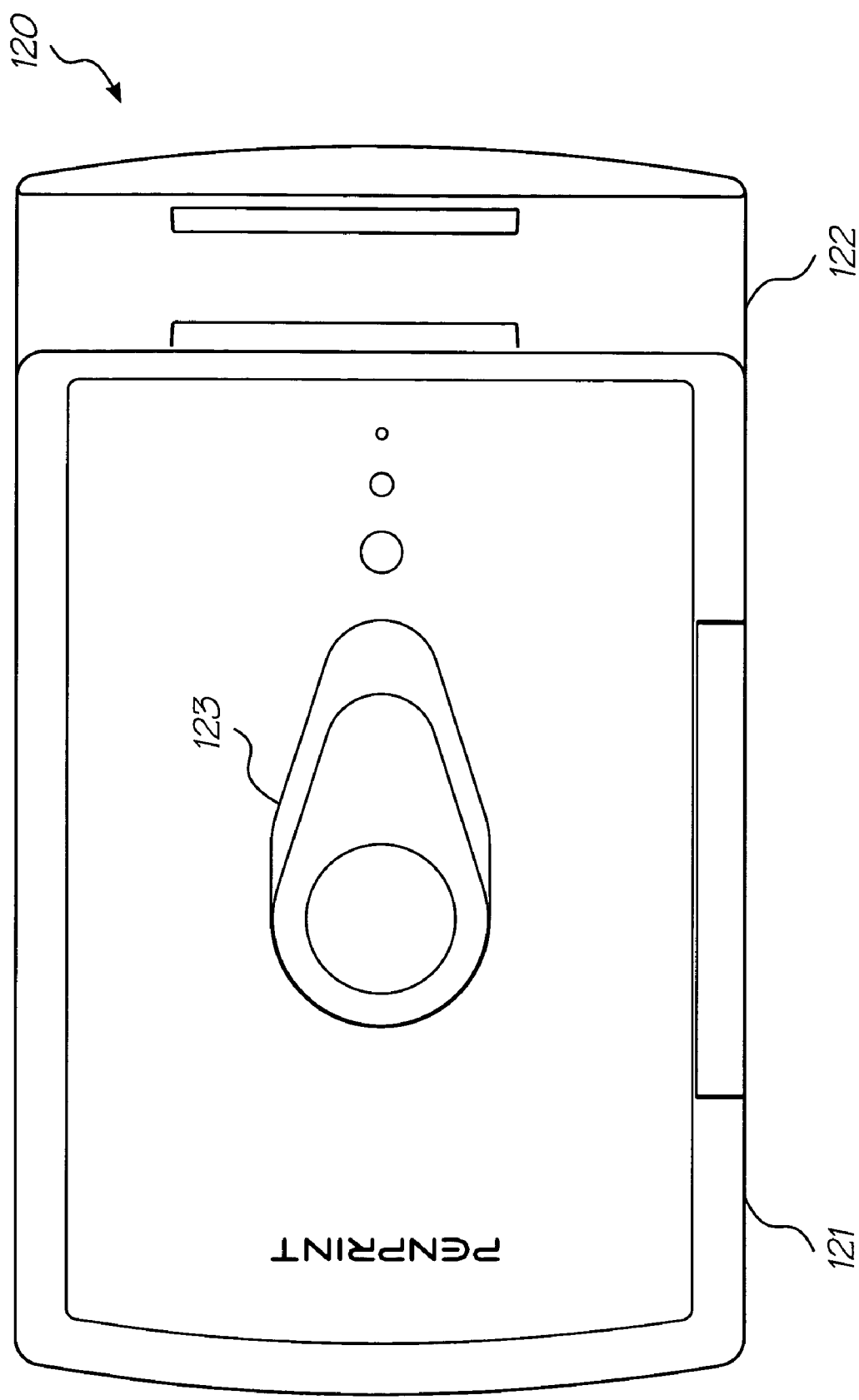
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
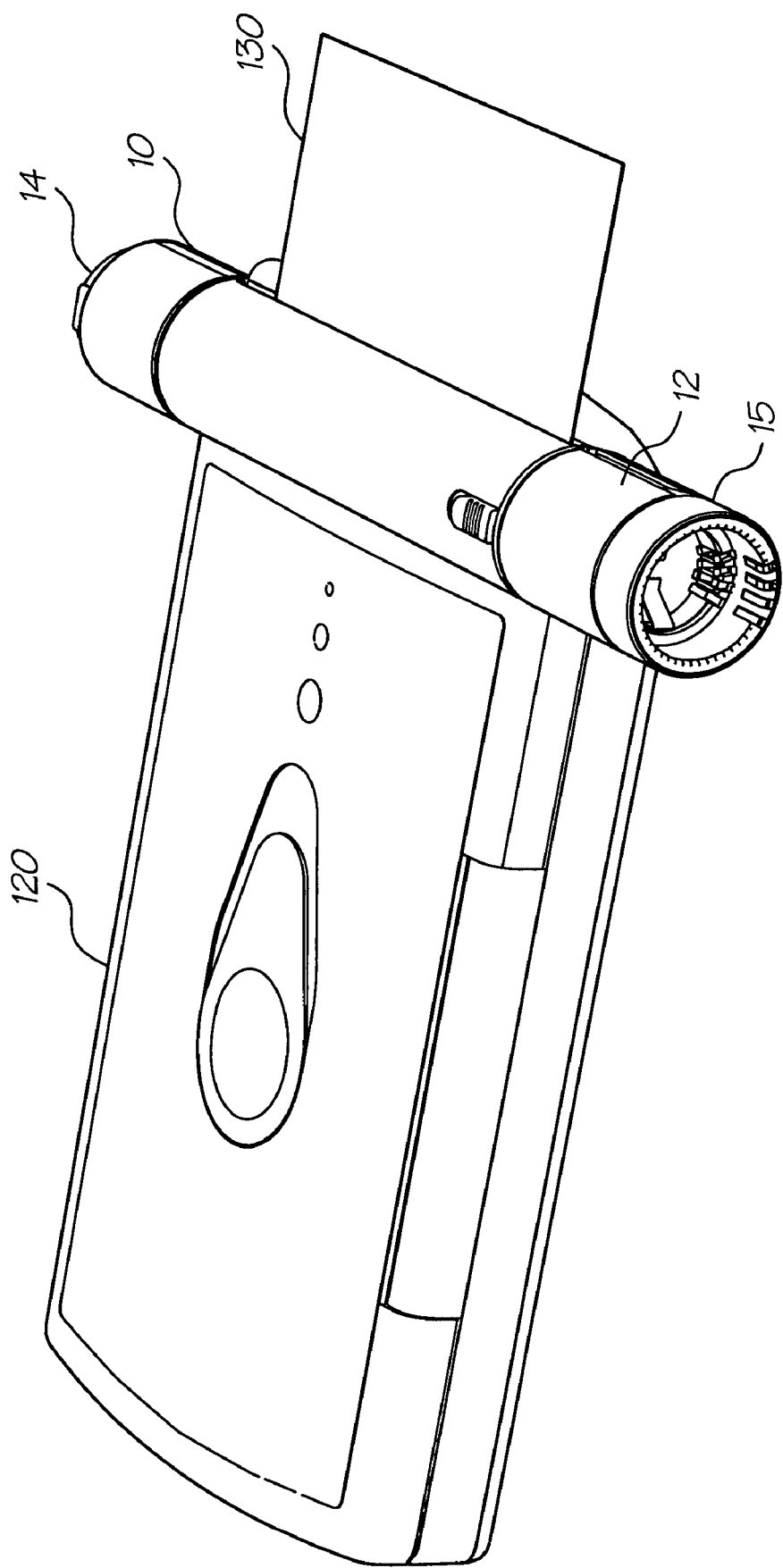
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
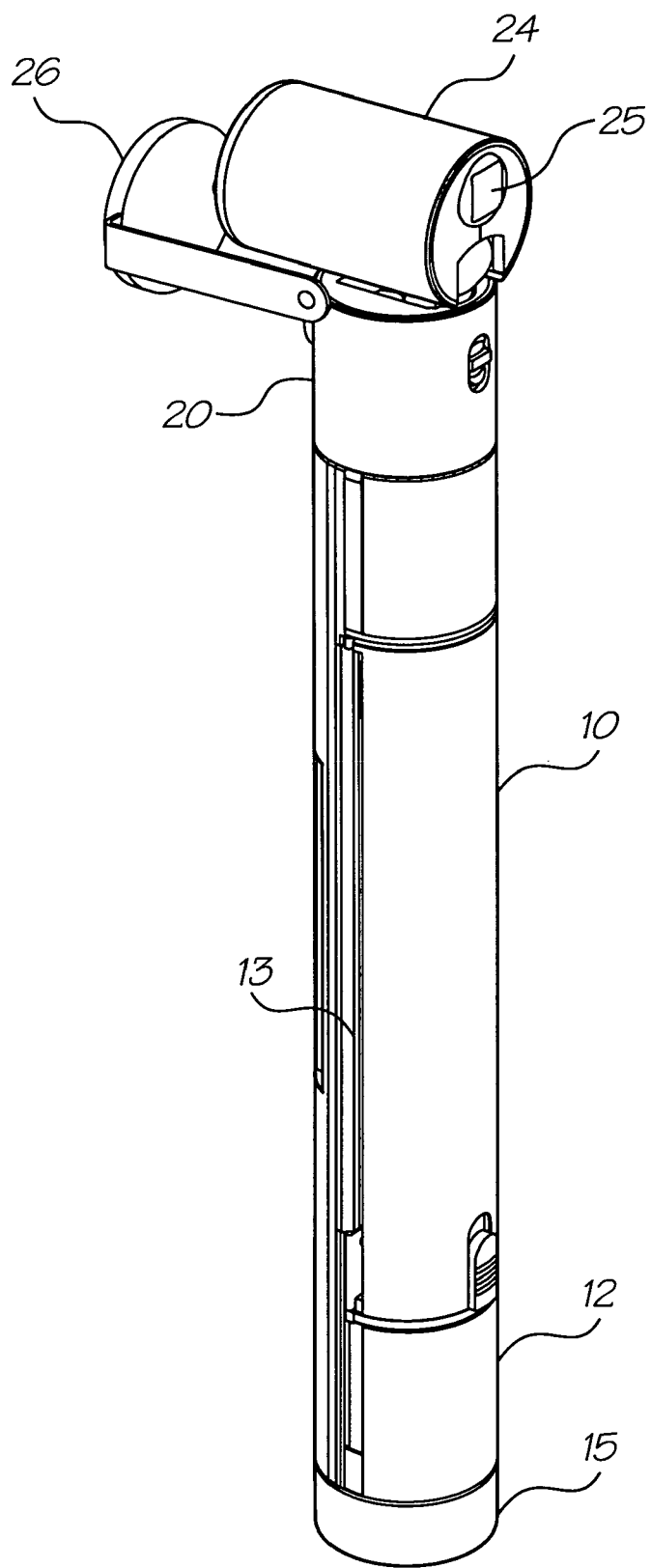
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
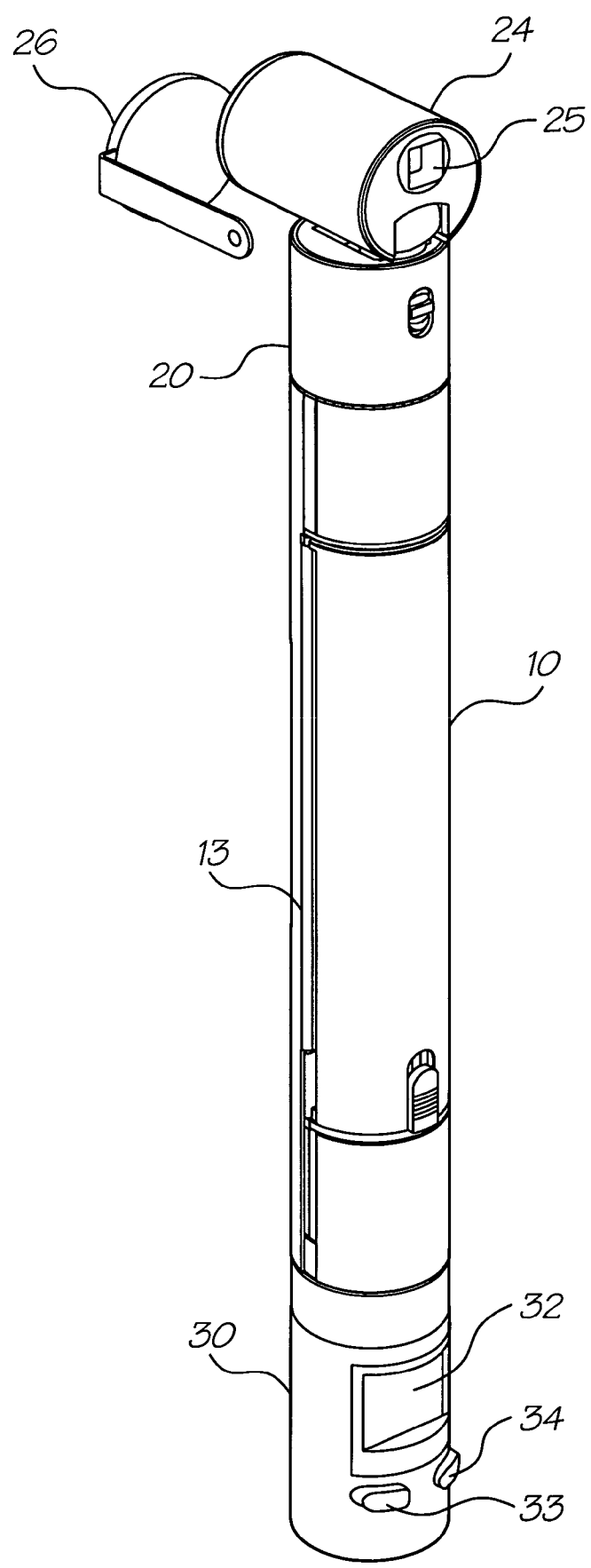
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
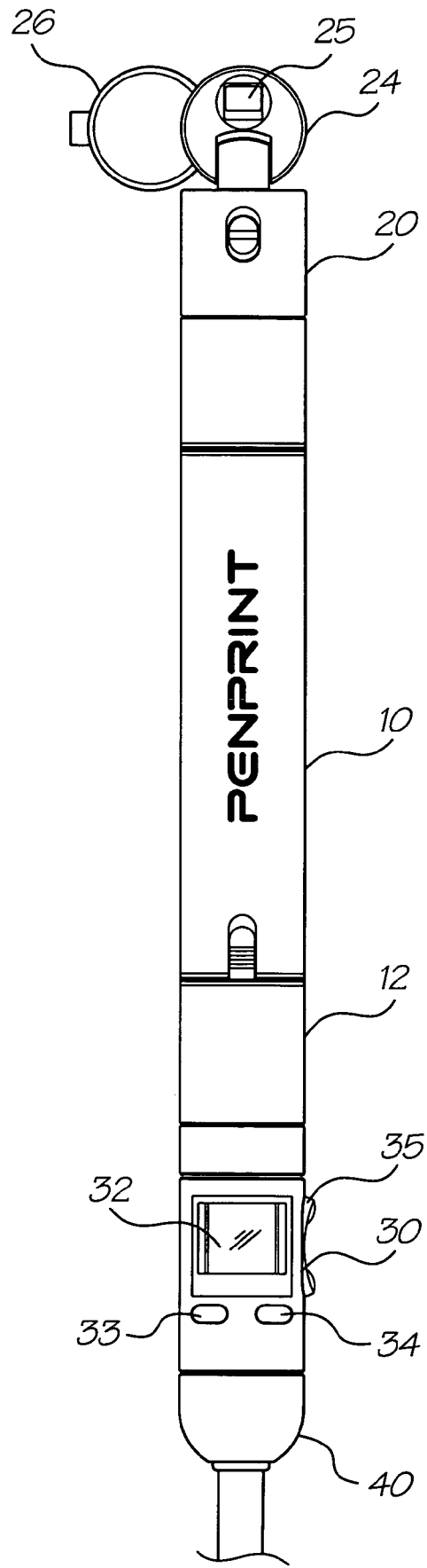
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

The Camera Module 20 provides a point-and-shoot camera component to the compact printer system as a means of capturing images. The Camera Module 20 is a standard module containing an image sensor and specialized image processing chip. Captured images are transferred to the Printer Module 10 for subsequent printing, manipulation, or storage. The Camera Module 20 may also contain a self-timer mode similar to that found on known cameras.

Figure 17:
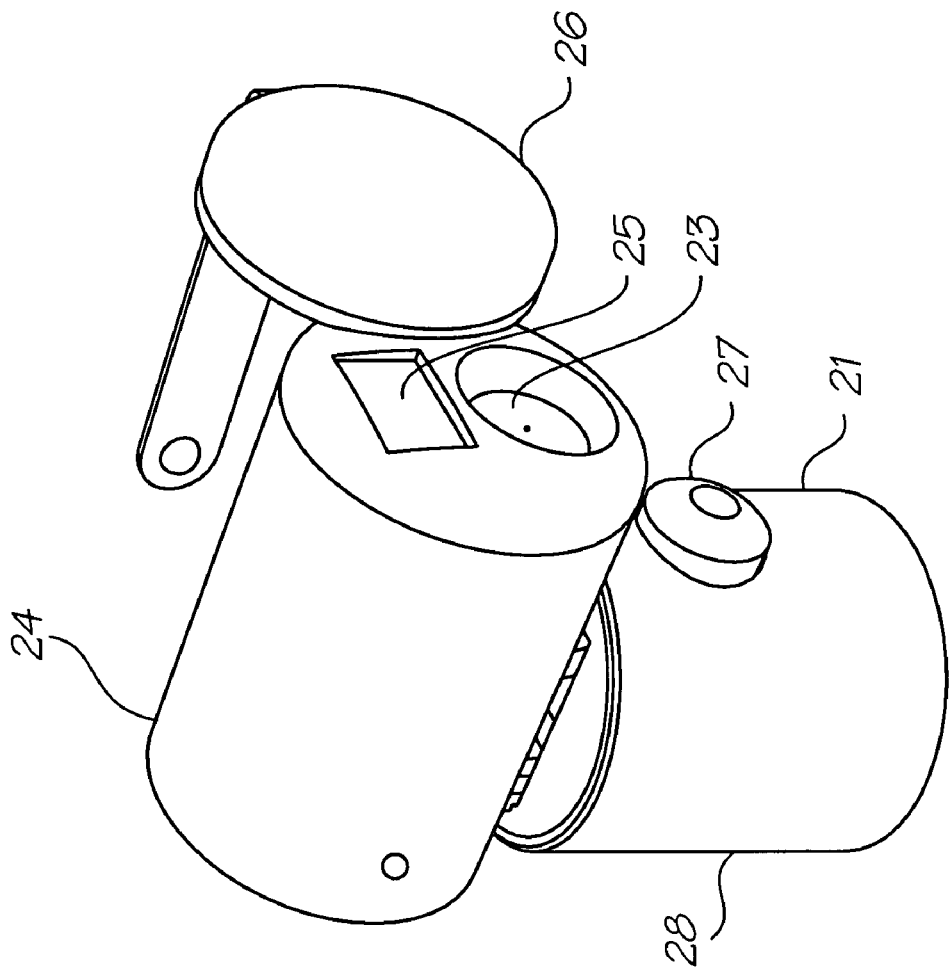
FIG. 17 is a perspective view of the camera module of FIG. 2.
Figure 18:
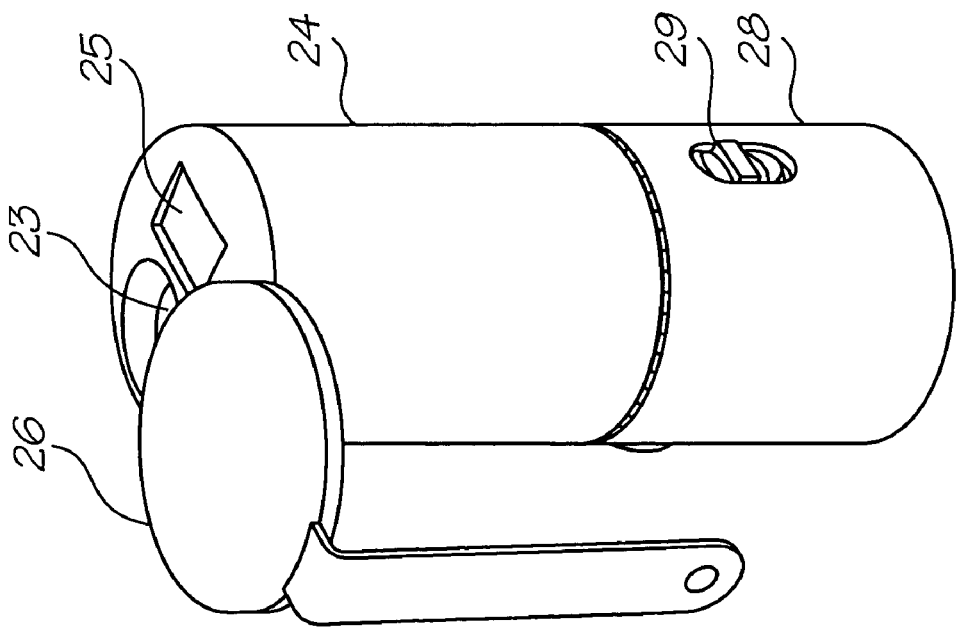
FIG. 18 is a perspective view of the camera module in a folded position.
Figure 20:
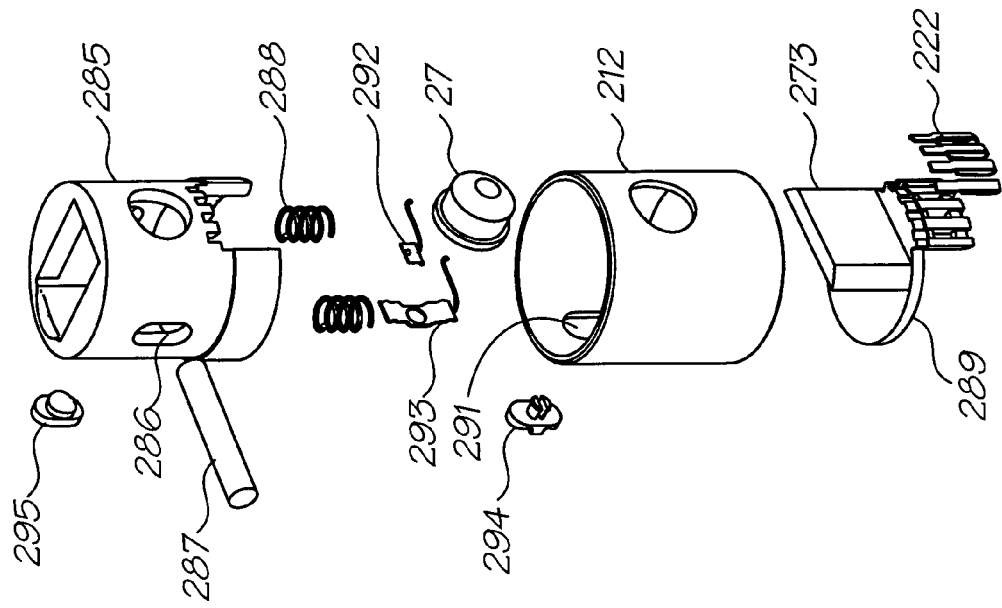
FIG. 20 is an exploded view of the base of the camera module.

FIG. 17 shows a magnified perspective view of the Camera Module 20, as previously described with reference to FIG. 2. As shown by FIG. 18, there is a swivel connection between the camera portion 24 and the base portion 28 that allows the camera 24 to be aligned with the base 28 for ease of carriage. Also visible in FIG. 18 is the self-timer switch 29.

Figure 19:
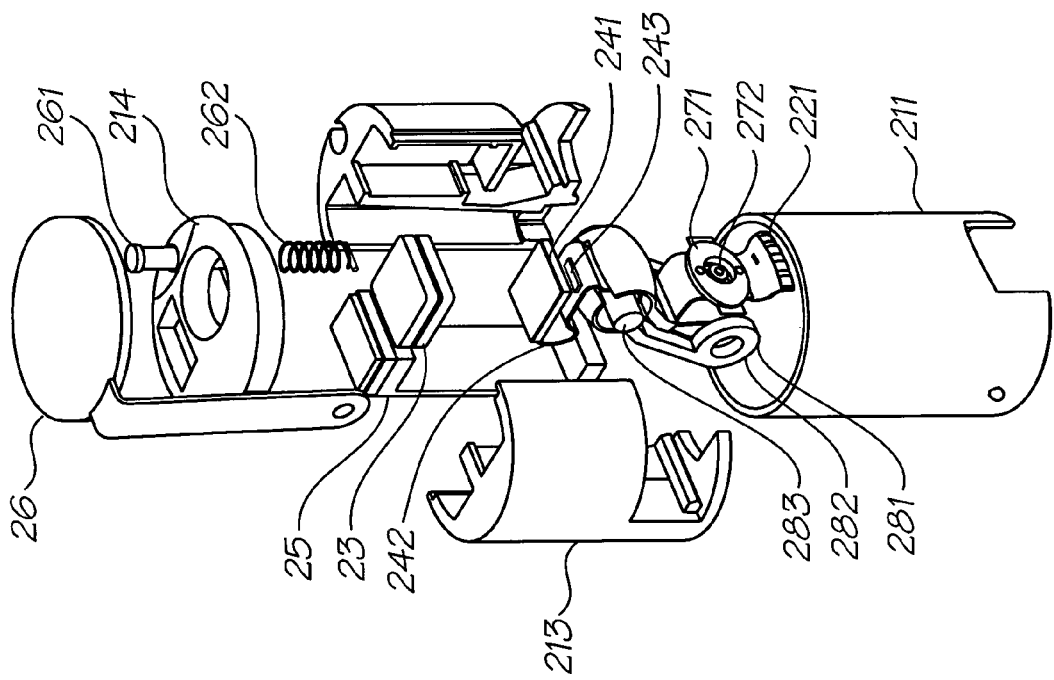
FIG. 19 is an exploded view of the camera of the camera module.

FIG. 19 is an exploded view of the camera 24. The core of the camera is a CMOS imaging sensor 241 mounted on a flexible printed circuit board (PCB) 242. Also formed on the PCB 242 is an image processing chip 243 which may be an application specific integrated circuit. The lens 23 focuses the view onto the image sensor 241. The viewfinder 25 allows the user to select the image to be captured by looking through eyepiece 251.

The lens 23, viewfinder 25 and image sensor 241 are held in chassis molding 213 formed as a pair of half moldings. A front molding 214 is glued to the chassis molding 213 and protects the lens 23 and viewfinder 25. The lens cap 26 rotates on pivot 261. The cap is spring loaded by spring 262.

The camera 24 is mechanically connected to base 28 by pivot assembly 281. The pivot assembly 281 consists of a cam molding 282. A pin 283 fits in hole 284 to hold the upper end of the cam molding 282 in the chasses molding 213. The lower end of the cam molding is held in the base 28 in the manner described below.

The flex PCB 242 threads through the cam molding and terminates in contacts 221 that connect to the Serial Bus at the female connector 22. A contact 271 forms part of the take button 27. An LED 272 in the take button 27 gives a visual indication of a ten second countdown that applies when the self-timer switch 29 activates the self-timer. The components of the camera 24 are contained within a metal case 211.

The base 28 includes an upper molding 285 with slot 286 that receives pin 287. The pin 287 captures the lower end of the pivot assembly 281. The pin 287 is biased by springs 288 towards the bottom of the slot 286. The camera 24 is lifted away from the base 28 to allow it to pivot between the positions shown in FIG. 17 and FIG. 18.

The self-timer switch 29 fits in slot 291 and activates the switch by sliding small contact 292 against large contact 293. The actual switch is formed in two parts 294 and 295.

The base 28 also includes a lower molding 289 that carries contact strips 222. The contacts 221 on the end of the flex PCB 242 mate with the contact strips 222 to make the contact to the Serial Bus. A flange 273 supports the flex PCB 242 in the vicinity of the take button contact 271.

The components of the base 28 are contained within a metal extrusion 212.

Figure 21:
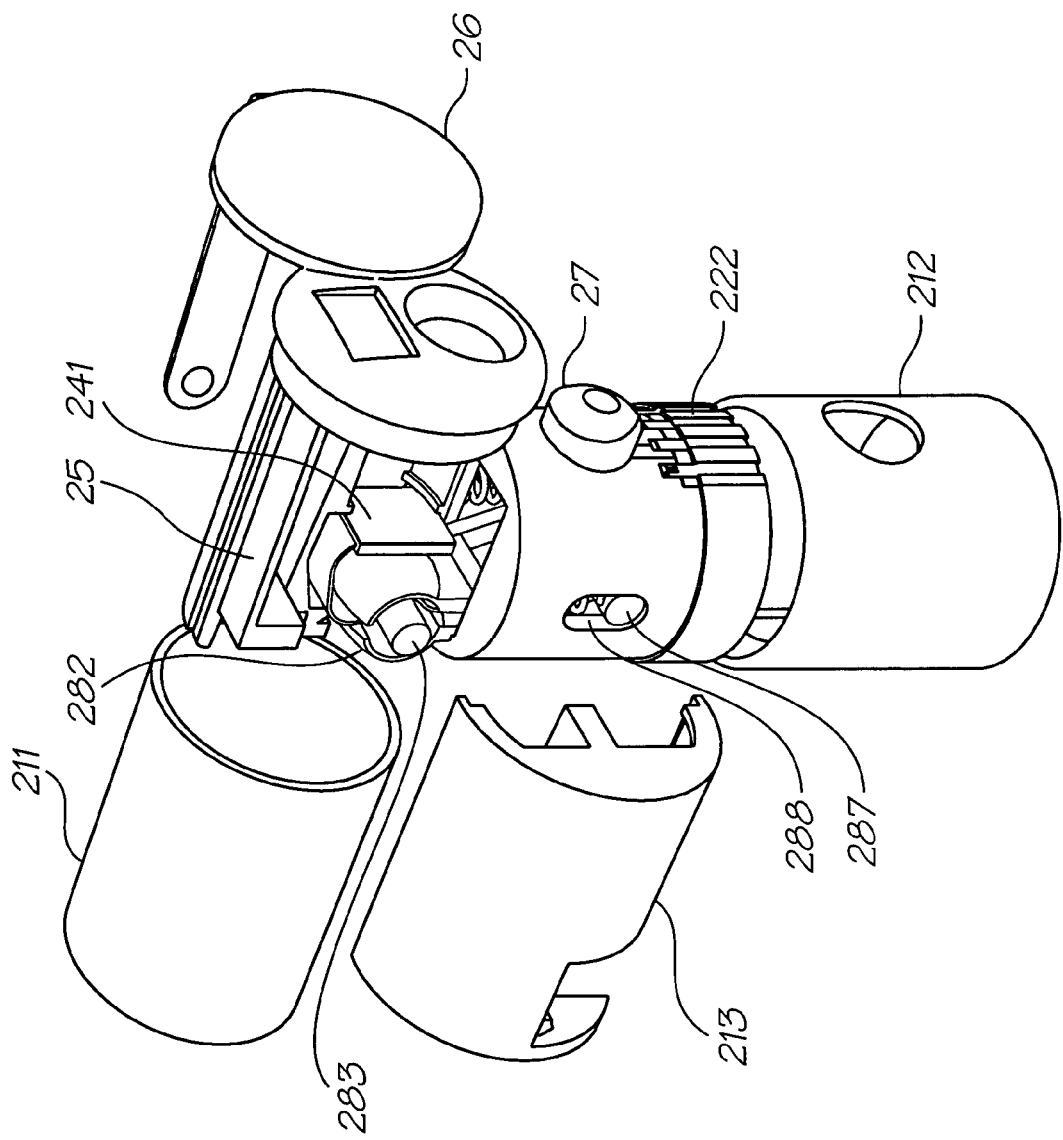
FIG. 21 is a partly exploded view of the camera module.
Figure 22:
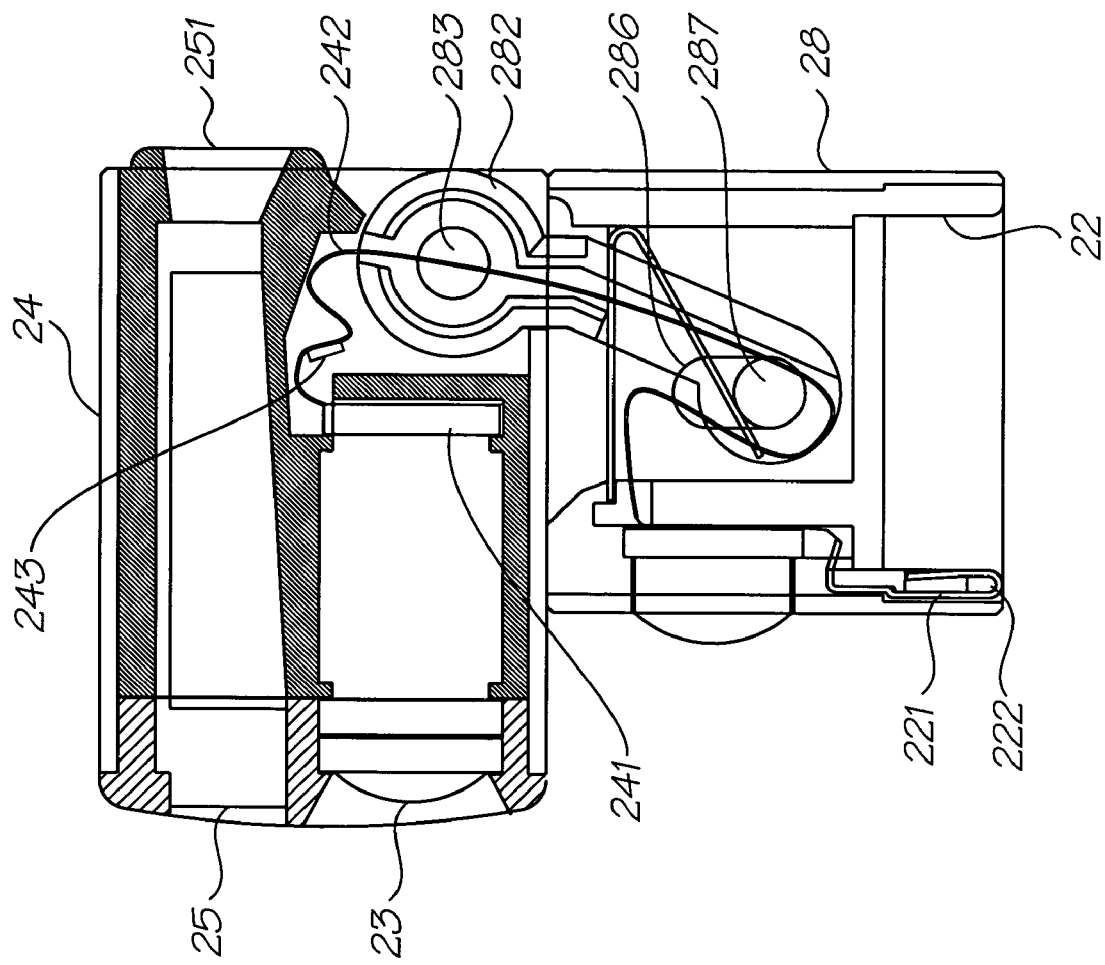
FIG. 22 is a cut away side view of the camera module of FIG. 17.

The manner in which the components fit together is made clear in FIG. 21 which is a partly exploded view of the camera module 20, and in FIG. 22 that is a cut-away view of the camera module 20. Looking particularly at FIG. 22, the path of the flex PCB 242 can be clearly seen.

The Camera Module 20 connects to a compact printer configuration via the female connector 22 which joins the camera module to the Serial Bus via contacts 222. Power is provided from the Printer module 10 via the Serial Bus.

To capture an image, a user simply presses the Take button 27. The viewfinder 25 allows the user to frame the image before pressing the Take button.

When the Take button 27 is pressed, the image is captured through the lens 23 and transferred to the Printer Module 10. If the Take button is pressed again, a new image will be captured and transferred to the Printer Module. The image is always transferred to the Printer module once the Take button is pressed. Although the image remains in the Camera Module, there is no physical method of transferring the image from the Camera Module again. The image must be saved from the Printer Module instead (to, for example, the Memory Module 30). The only way of directly accessing the captured image is via a computer interface using the communication module 40.

The self-timer switch 29 set to off/on disables and enables a ten second delay between the pressing of the Take button and the capturing of the image. The LED inside the Take button provides a visual feedback during the countdown. The LED flashes once per second, and then stays on for the final two seconds of the countdown. The self-timing functionality is therefore identical to that of a conventional camera.

If there is an active Flash Module 50 present in the compact printer configuration, then the Flash will be activated depending on the Flash Module's flash mode. If the Flash Module has been turned off, then the flash will not fire. If the Flash Module is set to auto, then the flash fires as necessary (light detection carried out by the Camera Module).

Figure 23:
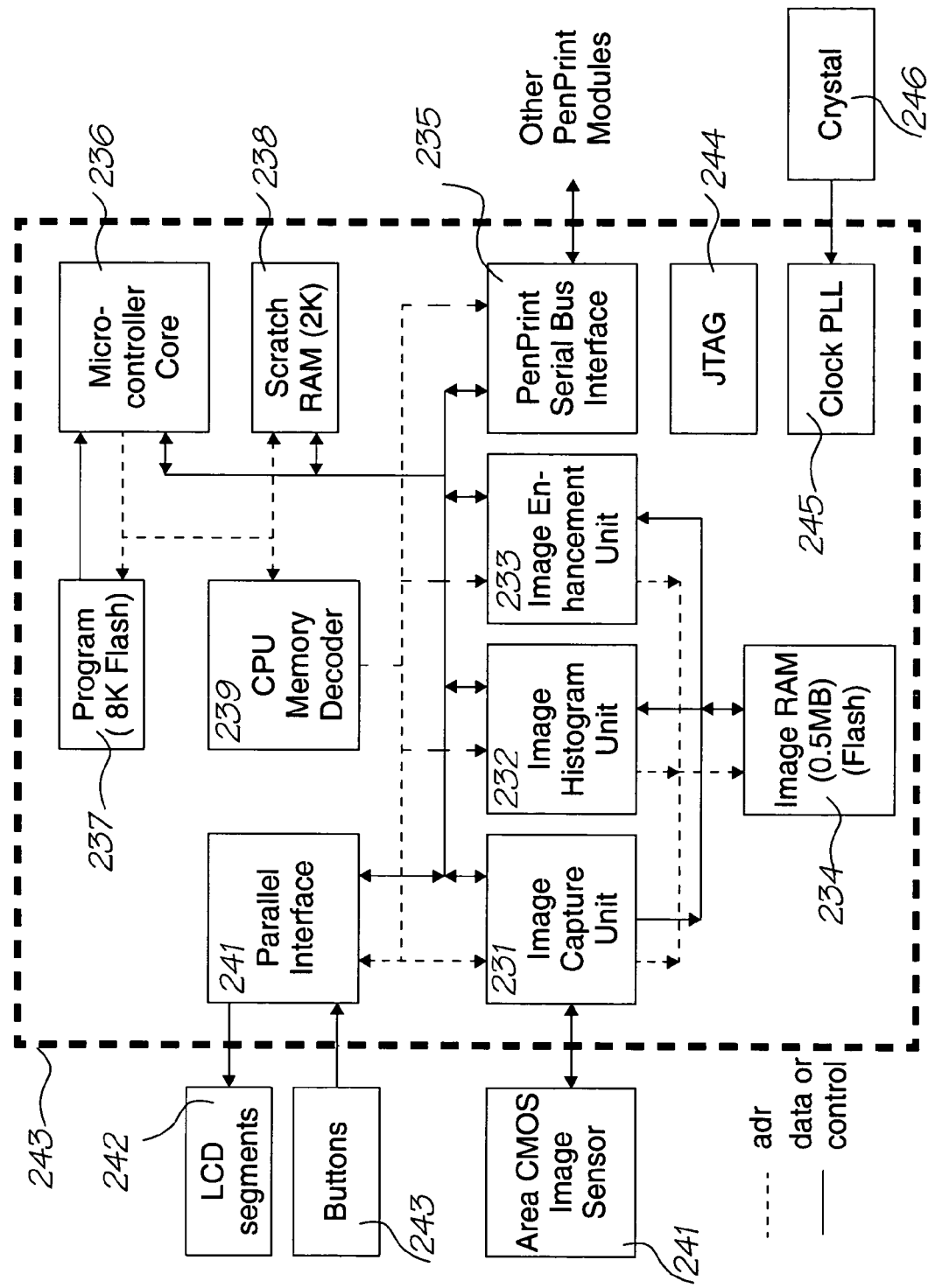
FIG. 23 is a block schematic diagram of an image processor chip.

As mentioned above, an application specific integrated circuit (ASIC) configured as an image processor 243 processes images captured by the image sensor 241. The elements of the image processor 243 are shown in FIG. 23. The elements of the image processor ASIC are described in detail in a co-pending application titled Image Processor for Printer Module. The image processor 243 includes an image capture unit 231 that receives an image from the image sensor 241. The image is processed by an image histogram unit 232 and image enhancement unit 233. The captured image is a Bayer color filter array RGB image and it is transformed to an 850×534 contone L*a*b* output image.

The processed image is stored in Image RAM 234. In normal operation the image is placed on the Serial Bus through the Serial Bus interface 235 and transferred to the printer module 10 for printing. A low speed CPU 236 with associated program memory 237 and variable memory 238 take care of housekeeping and administration tasks.

A CPU Memory Decoder 239 is a simple decoder for satisfying CPU data accesses. The Decoder translates data addresses into internal register accesses over the internal low speed bus 240, and therefore allows for memory mapped I/O of image processor registers. The bus 240 includes address lines 240a and data or control lines 240b.

A parallel interface 241 connects the image processor to individual static electrical signals, such as LCD segments 242 and buttons 243 (eg. self timer). The CPU 236 is able to control each of these connections as memory-mapped I/O via the low-speed bus 240.

A standard JTAG (Joint Test Action Group) Interface 244 may be included in the image processor for testing purposes. Due to the complexity of the chip, a variety of testing techniques are required, including BIST (Built In Self Test) and functional block isolation.

The image processor 236 may also include a clock phase-locked loop 245 that provides timing signals to the controller. The clock 245 draws a base signal from crystal oscillator 246. Some CPU include a clock so the clock 245 and crystal 246 may not be required.

The Camera Module 20 can be instructed to take a photo either by a computer (via the Communication Module 40) or by another module. However in both cases, the self-timer switch is ignored and the captured image is not transferred to the Printer Module. Instead, the image is simply captured and stored locally in the Camera Module in ImageRam 234. The Camera Module can then be instructed in a subsequent command to transfer its image to a specified module or simply to return it to the caller.

The combination of the camera module 20 with the printer module 10 constitutes a minimum compact printer system that allows an image to be captured and printed directly.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. A compact camera module and printer system comprising:
   an inkjet printer module having a full-width stationary printhead for printing a stored image on printable media in a single pass, the inkjet printer module having a tubular body and having at least one first connection means provided at an end of the tubular body; and
   a camera module operable to capture an image, the camera module having a tubular body and having a second connection means provided at one end of the tubular body, the second connection means operable to detachably couple with the at least one first connection means of the inkjet printer module, wherein
   the at least one first connection means and the second connection means form a bus operable to provide power and data between the camera module and the printer module,
   the inkjet printer module further comprises a slot provided along a length of the tubular body of the inkier printer module, the slot extending through a width of the tubular body such that first and second slot apertures are defined on opposite sides of the tubular body, and
   the slot is operable to receive print media through the first slot aperture and to pass the print media out through the second slot aperture.

2. The compact camera module and printer system of claim 1 further comprising an ink reservoir, the ink reservoir provided within the body of the inkjet printer module and in fluidic communication with the print head.

3. The compact camera module and printer system of claim 1 further comprising a memory module operable to store one or more images, the memory module having a tubular body and at least one third connection means provided at an end of the tubular body, wherein the third connection means is adapted to detachably couple with at least one of the at least one first connection means and the second connection means.

4. The compact camera module and printer system of claim 3, further comprising a communication module operable to facilitate communication between the camera module and printer system and an external device, the communication module having a tubular body, wherein
   the communication module includes a fourth connection means provided at a first end of the tubular body and a fifth connection means provided at a second end of the tubular body,
   the fourth connection means is adapted to detachably couple with at least one of the at least one first connection means, second connection means, and at least one third connection means, and
   the fifth connection means is adapted to detachably couple with the external device.

5. The compact camera module and printer system of claim 4, further comprising a flash module operable to generate a flash, the flash module having a tubular body and at least one sixth connection means provided at an end of the tubular body, the sixth connection means adapted to detachably couple with at least one of the at least one first connection means, second connection means, at least one third connection means, and fourth connection means.

6. The compact camera module and printer system of claim 5, further comprising an effects module operable to apply to an image stored in the printer module one or more graphical effects, the effects module having a tubular body and at least one seventh connection means provided at an end of the tubular body, the at least one seventh connection means adapted to detachably couple with at least one of: the at least one first connection means, the second connection means, the at least one third connection means, the fourth connection means, and the at least one sixth connection means.

7. The compact camera module and printer system of claim 1, wherein the tubular body of the camera module includes a base portion and a camera portion, the camera portion connected to the base portion by a pivot assembly.

8. The compact camera module and printer system of claim 7, wherein an imaging sensor of the camera module is located such that a direction of image capture is along a longitudinal axis of the camera portion.

9. The compact camera module and printer system of claim 1, wherein the tubular body of the inkjet printer module is provided with two connection means, a first of the two connection means being a male connector and provided at one end of the tubular body, and a second of the two connection means being a female connector and provided at the other end of the tubular body.

10. The compact camera module and printer system of claim 1, wherein the tubular body of the inkjet printer module has a substantially circular cross-section.

11. The compact camera module and printer system of claim 1, wherein the tubular body of the camera module has a substantially circular cross-section.

* * * * *